Dec. 26, 1961        J. A. CLARK        3,015,028
AUTOMATIC SERIOGRAPH
Original Filed Feb. 8, 1955        5 Sheets-Sheet 1
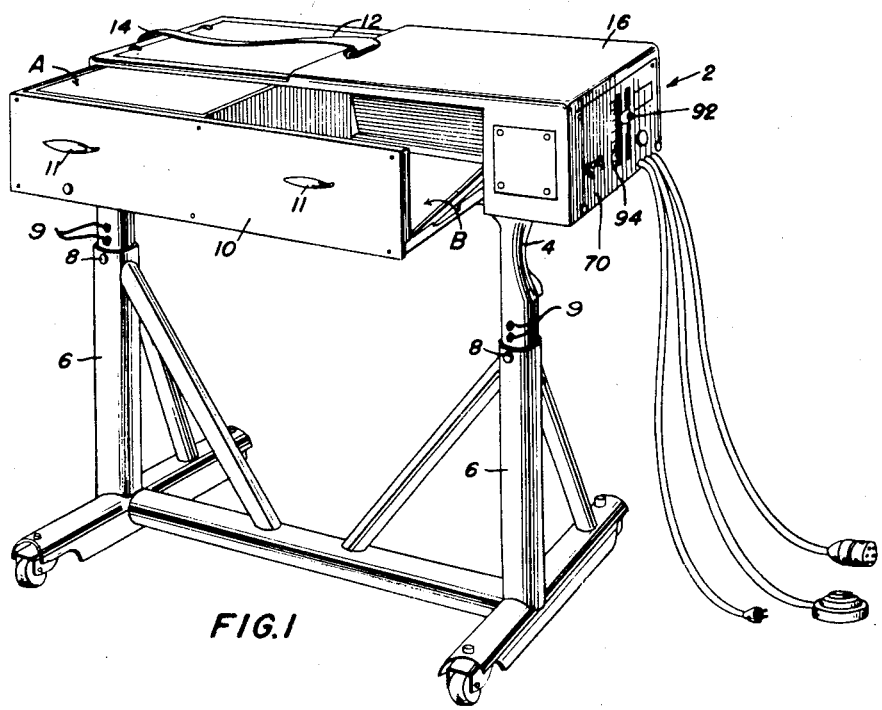
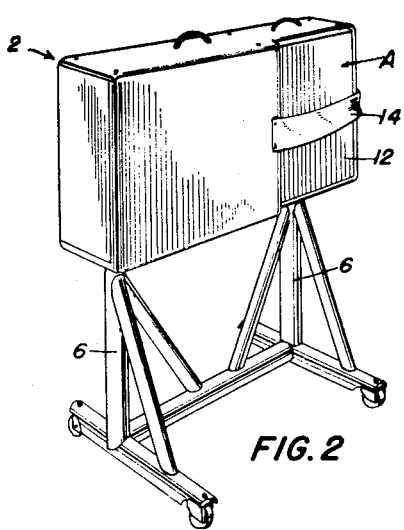
FIG.2
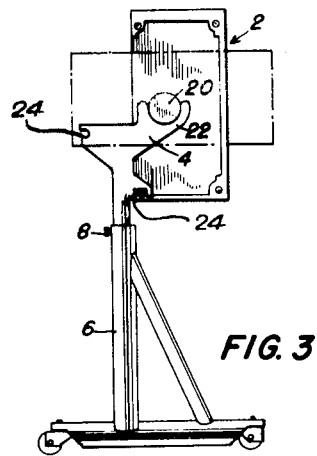
FIG.3
INVENTOR
JAMES A. CLARK
BY *Robert H. Lentz*
ATTORNEY Dec. 26, 1961 J. A. CLARK 3,015,028
AUTOMATIC SERIOGRAPH
Original Filed Feb. 8, 1955 5 Sheets-Sheet 2
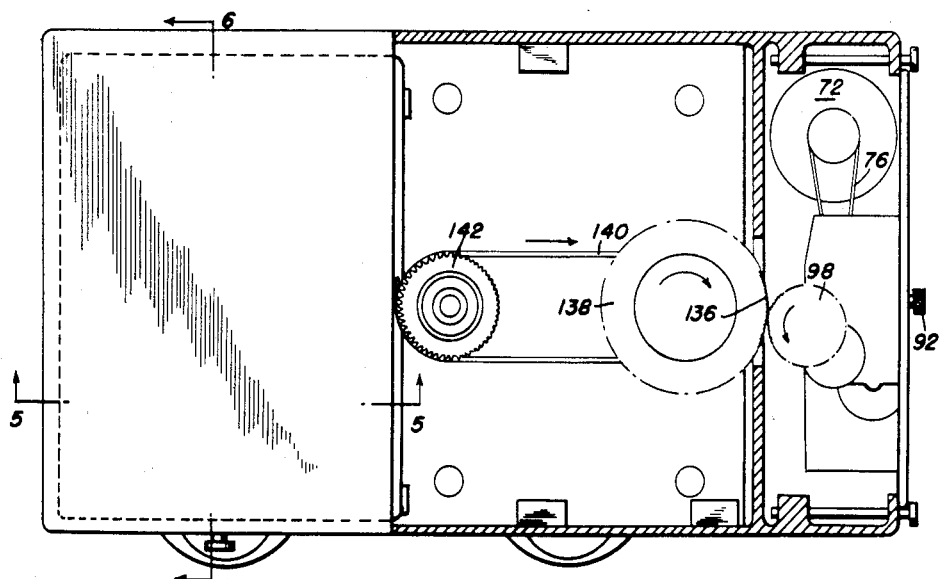
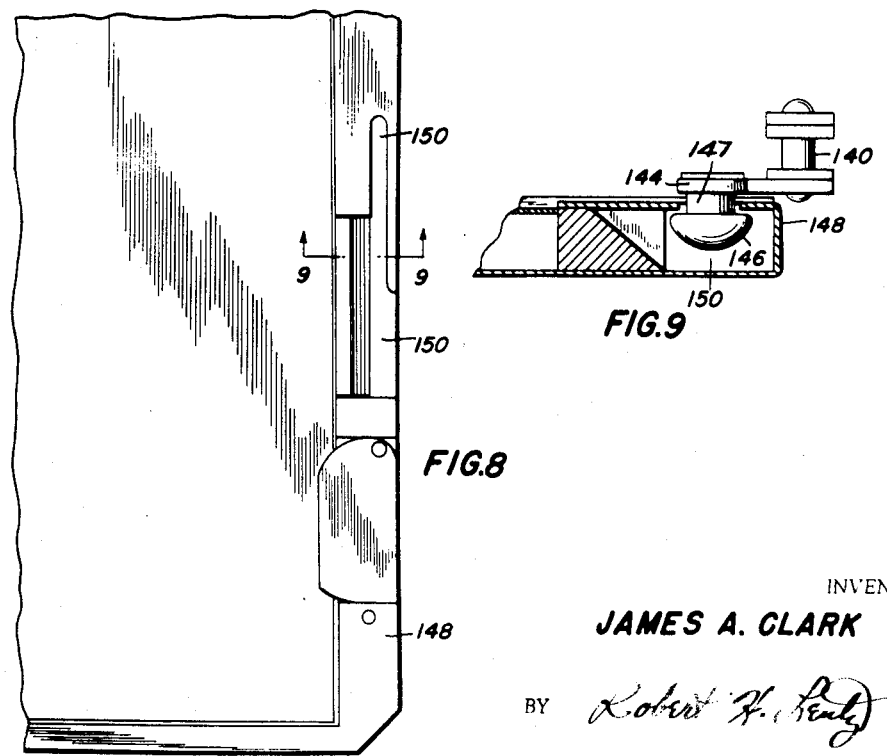
INVENTOR
JAMES A. CLARK
ATTORNEY Dec. 26, 1961  J. A. CLARK  3,015,028
AUTOMATIC SERIOGRAPH
Original Filed Feb. 8, 1955  5 Sheets-Sheet 3

INVENTOR
JAMES A. CLARK
BY Robert H. Lentz
ATTORNEY

Dec. 26, 1961 J. A. CLARK 3,015,028
AUTOMATIC SERIOGRAPH
Original Filed Feb. 8, 1955 5 Sheets-Sheet 4
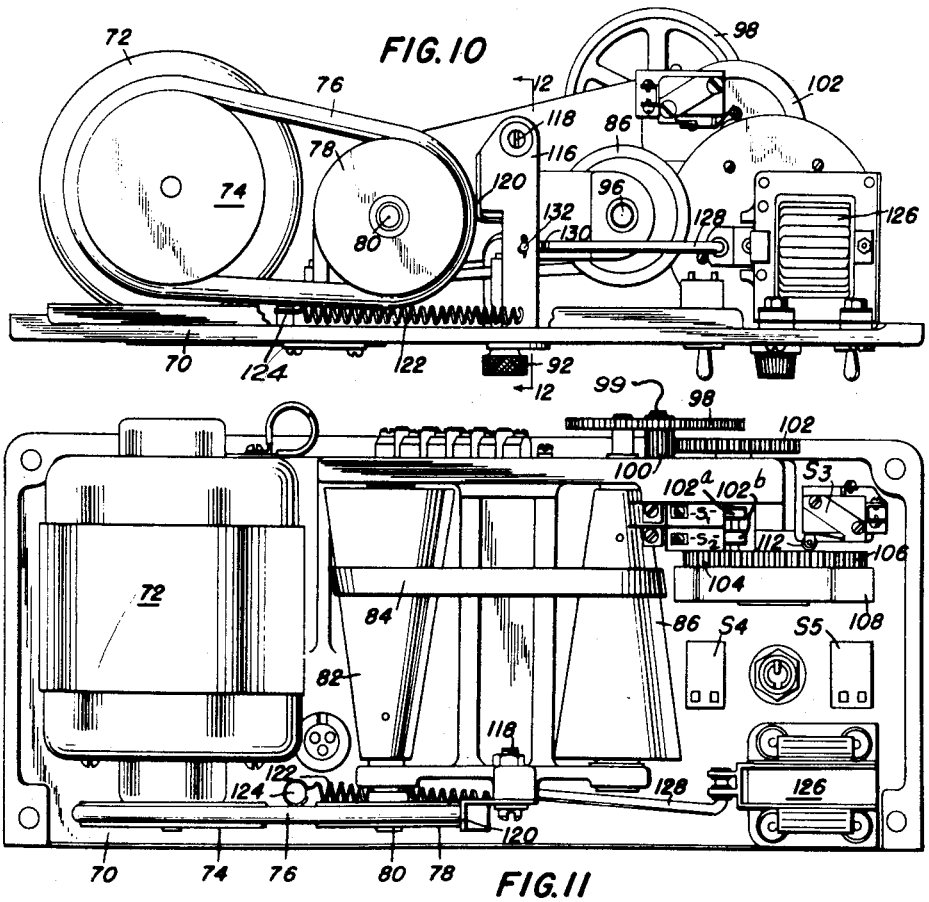
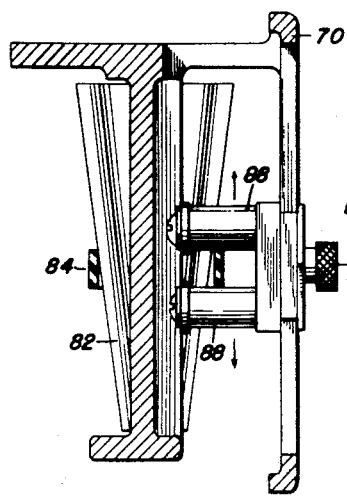
INVENTOR
JAMES A. CLARK
BY Robert H. Lentz
ATTORNEY

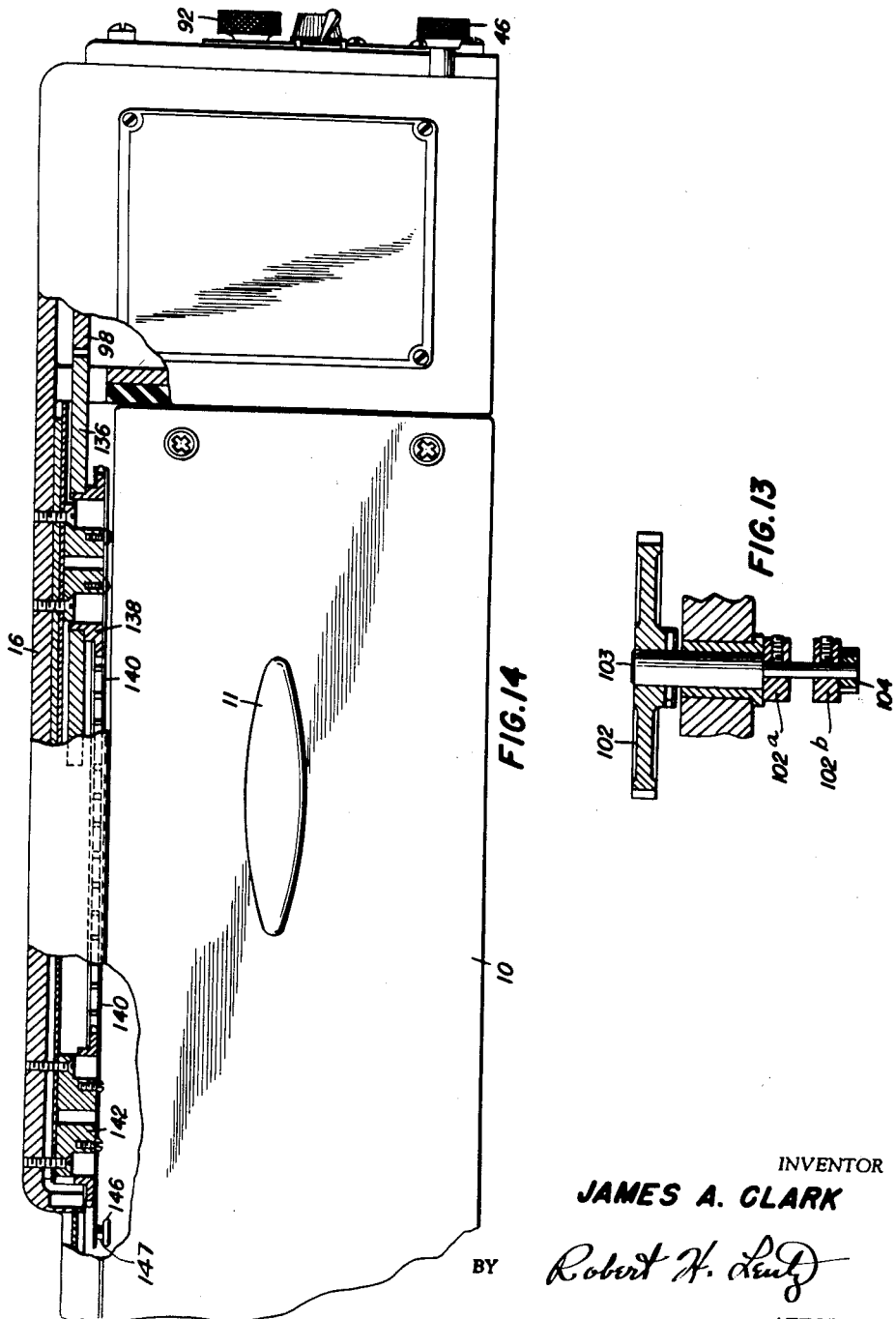

United States Patent Office 3,015,028
Patented Dec. 26, 1961

3,015,028
AUTOMATIC SERIOGRAPH
James A. Clark, Rochester, N.Y., assignor to The Automatic Seriograph Corporation, College Park, Md.
Original application Feb. 8, 1955, Ser. No. 486,847, now Patent No. 2,881,323, dated Apr. 7, 1959. Divided and this application Jan. 30, 1959, Ser. No. 790,257
4 Claims. (Cl. 250—66)

This invention relates to improvements in an automatic seriograph machine for diagnostic X-ray use and more particularly for taking roentgenograms of the brain, heart, lungs, kidneys and the study of other circulatory processes thereof. This application has been divided out from my copending U.S. patent application Serial No. 486,847, filed February 8, 1955, for Seriograph, now Patent 2,881,323, issued April 7, 1959.

The present invention comprises improved control circuits and switches for taking X-rays in fairly rapid succession at intervals of from ½ to 2 or more seconds, as required, as where it is desired to study the progress and diffusion of a substance opaque to X-rays, through various parts of the body. As will be disclosed in more detail hereinbelow, the seriograph of the invention employs a cassette holder which is mounted to move on a horizontal axis for the use in either a horizontal or vertical position, the cassette holder being provided with improved features for bringing the cassettes successively to the exposure position and then transferring to second compartment after exposure. This cassette holder can be used with any standard X-ray equipment.

More particularly, the cassette holder comprises a housing mounted on vertically adjustable forked standards for supporting the housing for movement about a horizontal axis, which axis is near the center of gravity of the housing; accordingly the housing is therefore balanced to move readily about such axis. The housing is provided with a slidable drawer having two compartments, one for holding the cassettes before exposure, the other for holding the cassettes after exposure, and with an automatic mechanism for rapidly trransferring the cassettes from one compartment to the other. In addition, the first or storage compartment is provided with a spring-operated bottom and special manually controlled latching means for use in loading the compartment and releasing the spring tension after loading for normal operation.

The second compartment for the exposed cassettes, on the other hand, is provided with an inclined and shouldered wall, which wall in effect is the bottom of the compartment when the drawer is in a vertical plane and which is of particular value when the drawer is in a vertical plane in that the lower edges of the exposed cassettes, as they arrive successively in the storage compartment after exposure, slide down the inclined wall, hit the shoulder thereon, the top of the cassette continuing a little farther, so that the cassette comes to rest in an inclined position. The several exposed cassettes, therefore, stack themselves at the far side of the drawer, even though they are positioned in nearly a vertical plane.

The invention will be described in more detail by reference to the accompanying drawings, wherein:

FIG. 1 is a perspective view of the cassette holder of this invention in the horizontal position;

FIG. 2 is a perspective view showing the cassette holder in a vertical position;

FIG. 3 is an end view of the cassette holder of FIG. 2;

FIG. 4 is a horizontal cross-section of the cassette holder;

FIG. 8 is a plan view of a portion of a cassette showing a detail thereof;

FIG. 9 is an enlarged section taken along line 9—9 of FIG. 8;

FIG. 10 is a side view of the motor driven apparatus for transferring exposed cassettes;

FIG. 11 is a plan view of the apparatus of FIG. 10;

FIG. 12 is an enlarged section taken along section line 12—12 of FIG. 10;

FIG. 13 is a sectional view of a detail; and

FIG. 14 is a vertical sectional view through a portion of the top of the cassette moving apparatus.

Figure 5:
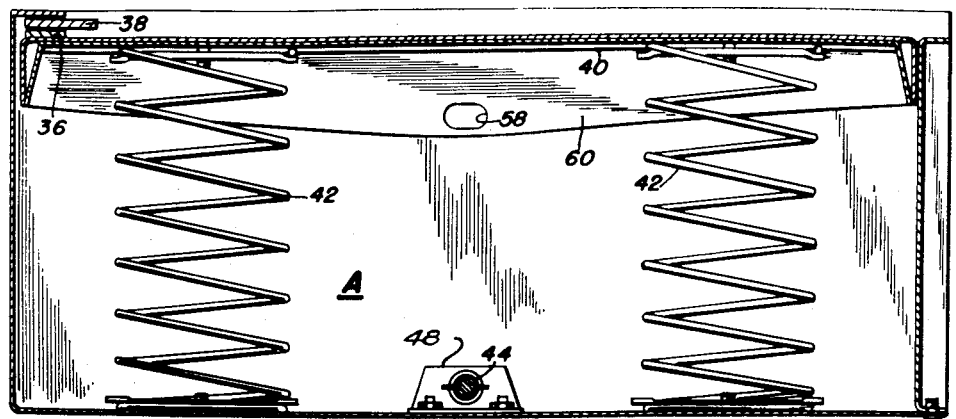
FIG. 5 is a vertical cross-section taken along section line 5—5 of FIG. 4.

Referring now to these drawings as shown in FIGS. 1 through 3, the cassette holder comprises a housing indicated generally at 2, supported on forked brackets 4, which telescope into hollow standards 6 and are vertically positionable at desired heights by pins 8 positionable in holes 9 in brackets 4.

The box-like housing 2 is built to accommodate a slidable drawer 10 with handles 11, the drawer having a compartment A for holding a stack of unexposed cassettes, and a second, adjacent compartment B for receiving the cassettes after exposure. That portion of the housing 2 above compartment A is provided with a suitable cover 12 pervious to X-rays and may be provided with a strap 14 for holding the patient in position. The housing above compartment B has a cover 16.

The inside of the housing 2 near each end is provided with two aligned bosses or trunnions 20, defining an axis going nearly through the center of the housing. These trunnions 20 fit into the forks 22 of brackets 4 so that the casing may be readily swung about the axis defined by the trunnions 20 to either the horizontal or vertical position, as in FIG. 3. Bracket 4 is provided with notches 24 adapted to engage conventional latches carried by the casing 2 to latch the casing in either position.

Figure 6:
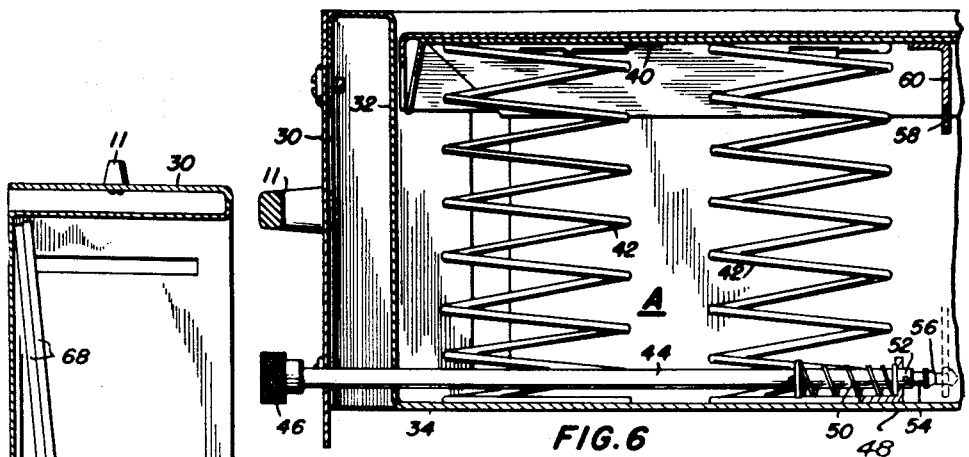
FIG. 6 is a vertical cross-section taken along section line 6—6 of FIG. 4.

Referring now to FIGS. 5 and 6, compartment A of drawer 10 comprises a front wall 30, an inner wall 32 and a bottom wall 34. The upper peripheral edge of compartment A is provided on the front, left and rear with a grid frame 36 and a grid support 38, against the underside of which the peripheral edges of a cassette are pressed by the movable, spring-pressed presser plate 40. The presser plate 40 is pressed upwardly by a series of compression springs 42, preferably about eight such springs being used, confined between plate 40 and the bottom 34 of compartment A. These springs are fairly strong, their function being to press as many as about 12 cassettes upwardly to exposure position.

An important feature in this connection is a hand-operated spring latching means for holding down the presser plate for loading. This comprises a latch rod 44 having a hand-operated knob 46, the rod 44 passing through an angle bracket 48; rod 44 is provided with a fixed washer, between which and the angle bracket 48 is confined a compression spring 50; a limit pin 52 is carried by rod 44 on the other side of the bracket 48. The end of rod 44 is provided with a latching groove 54 and head 56. The parts just described latch into a hole 58 in the vertical face of an angle bracket 60 secured to the underside of presser plate 40, this bracket being located at about the middle of the presser plate, as shown in FIG. 5.

In the process of loading compartment A with a stack of unexposed cassettes, the operator presses down on plate 40 with one hand, and when hole 58 is in line with end 56 of rod 44, pushes the rod end into hole 58, releases pressure on plate 40, thereby latching it down. The desired number of cassettes, usually from six to twelve, are stacked on plate 40, after which pressure is applied to release rod 44 so that it can be withdrawn from hole 58, the stack of cassettes thereby being pressed strongly upwardly by the several springs 42, so that as successive cassettes are exposed and removed, an unexposed cassette is moved to exposure position.

An important feature of the invention is that the cassette holder is pivoted on a horizontal axis as defined by trunnions 20, as shown in FIG. 3, so that it may be readily moved back and forth between positions in horizontal and vertical planes. With such apparatus, two of the machines may be set side by side, and two X-ray pictures may be taken simultaneously, on different axes. When the cassette holder is in a horizontal plane, the exposed cassettes, when carried from compartment A to B, readily drop by gravity to the bottom of B. However, when the drawer 10 is in the vertical position, as in FIG. 7, gravity is not effective, and an improved feature is utilized for causing the cassettes to stack readily toward the bottom of B.

Figure 7:
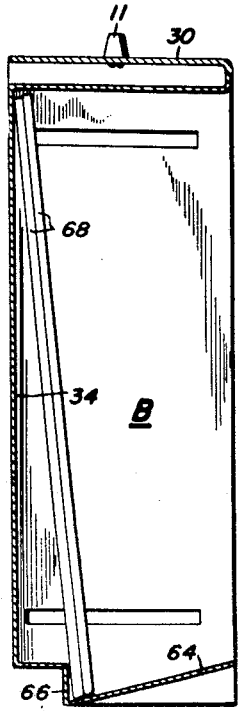
FIG. 7 is a cross-section of the cassette drawer for exposed cassettes, the drawer being in a vertical position.

As shown in FIG. 7, compartment B for the exposed cassettes comprises a bottom 34, which is a continuation of wall 34 of compartment A, and has a front wall 30. The important feature is an inclined back (or bottom) wall 64, which in FIG. 7 is in effect a bottom wall, downwardly inclined toward the bottom 34, as seen in FIG. 7. This wall 64 is provided with an upwardly and inwardly extending shoulder 66. As the exposed cassettes 68 are fed into compartment B, the bottom edges ride down slope 64 and engage against shoulder 66, while the top edges continue and fall toward wall 34, so that the cassettes are diagonally stacked against wall 34, as in FIG. 7, when the holder is in the vertical position.

Referring now to FIGS. 10, 11 and 12, the mechanism for periodically moving the cassettes from exposure position in compartment A to compartment B will now be described, this mechanism being positioned in the right hand side of housing 2, FIG. 1. This mechanism comprises a base or mounting plate 70, on which is mounted a motor 72 which drives pulley 74 and round belt 76 thereon, belt 76 driving pulley 78 on shaft 80 carrying cone pulley 82 which drives belt 84, which in turn drives reverse cone pulley 86. Belt 84 may be moved lengthwise of the cones by rollers 88, FIG. 12, mounted on a bracket between the cone pulleys to straddle belt 84. This bracket may be moved lengthwise of the cones by knob 92 to provide thereby a change speed drive. Knob 92 carries screw threads so that it may be loosened, moved and tightened, as desired. The outside of plate 70, alongside knob 92, is provided with calibrations 94 for indicating the speed.

As shown in FIG. 11, cone 86 is mounted on shaft 96 on the end of which is a small pinion which meshes with and drives a large gear wheel 98 on shaft 99, which shaft drives small gear 100, which in turn meshes with an drives a cam-drive or timing gear 102 on shaft 103, and thereby drives two timing cams 102A and 102B secured by set screws on shaft 103, FIG. 13. In addition, shaft 103 drives a small pinion 104 which meshes with and drives a large drum gear 106 which carries a numbered drum 108, usually numbered from 1 to 12 for indicating the number of exposures.

As further shown in FIG. 11, timing cam 102A operates a microswitch S1 to close a circuit for starting the X-ray mechanism. The other timing cam 102B operates a microswitch S2, after a cassette has been exposed, and transferred, to open the X-ray circuit and to close the solenoid brake circuit, so that the brake spring actuates the brake (described below) to stop the motor instantly after each exposure. A third microswitch S3, operated by a roller 112 bearing against the side of a drum gear 106, is actuated once for each revolution of 106 by a cam thereon to open the X-ray circuit and to open the brake circuit after 12 cassettes have been exposed to stop the machine.

The brake for stopping the motor quickly comprises a brake arm 116, FIG. 10, pivoted on a shaft 118 and provided with a brake shoe 120 adapted to press against motor driven belt 76 by means of a strong spring 122 attached to the lower end of arm 116 and having its other end anchored at 124 to the frame, the spring serving to apply the brake. The brake is held in the off position by a solenoid 126, operatively connected by rod 128 to brake shoe 120 at its threaded end 130 by a pin 132 swiveled in arm 116 to avoid binding. When the solenoid is energized, the brake is held in the off position; when de-energized, the spring 122 applies the brake shoe 120 to stop the belt 76 and the parts driven thereby. It will be noted that the described brake is self-energizing, in that when the spring 122 applies the brake, the friction causes the brake shoe to jam more tightly against the belt 76, stopping it very quickly.

The mechanism for removing an exposed cassette from exposure position and depositing it in compartment B, as previously described in connection with FIG. 1, will now be described, this mechanism comprising sprockets and a chain positioned in a plane parallel to and below the top 16 of the housing. More specifically, the gear 98, FIGS. 10 and 11, meshes with a driving gear 136, shown in FIG. 14, on the axis of which is a driving sprocket 138 which drives an endless chain 140 on driven sprocket 142.

Chain 140 carries an offset pin or button 144, FIGS. 9 and 14, having an enlarged head or shoulder 146, this button being adapted to latch into one edge of an exposed cassette and transfer it to the compartment B for exposed cassettes. An important feature is the shape of this pin. The head is enlarged to provide a peripheral groove 147 which, in addition to engaging the edge of the cassette, supports the cassette during the transfer period, thus ensuring the cassette being drawn straight from compartment A without tilting or misalignment and ensures continuous, positive engagement of the pin with the cassette edge during entire transfer period. To this end, as shown in FIG. 8, one edge 148 of the cassette frame is provided with a top and laterally open groove or slot 150, this slot 150 being positioned in the path of pin 144 as it goes around sprocket 142. As the pin does this, the pin 144 snaps into slot 150 in the cassette and moves to the narrow end of the slot and button 146 engages and supports the cassette and carries it over compartment B. When the cassette is over compartment B thereafter, pin 144 is rounding gear 138 and so releases itself from slot 150 in the cassette frame and the cassette drops into compartment B.

It will be recognized from the foregoing description of the operation of the automatic seriograph of the invention that the associated electrical circuits for selectively energizing and de-energizing motor 72 and brake solenoid 126, under the control of the various control switches, are relatively simple and straightforward. Since these circuits are not an essential element of any of the claims set forth hereinbelow, and moreover, since a typical circuit for operating the seriograph of the invention is shown and described in detail in the aforementioned parent U.S. patent application S.N. 486,487 from which the present invention has been restricted, further description thereof is considered unnecessary.

What is claimed as new is:

1. In an automatic seriograph, a cassette holder for use with an X-ray machine and adapted to permit operation on a patient in either a horizontal or vertical position, said cassette holder comprising: a housing; a slidable drawer in said housing containing compartments for holding stacks of unexposed and exposed cassettes; horizontally aligned trunnions carried by the underside of said housing; supporting brackets means for engaging said trunnions for supporting the housing for movement about the axis defined by said trunnions; and means positioned in the compartment in said slidable drawer holding said exposed cassettes for stacking said exposed cassettes in a position removed from the path along which newly exposed cassetts are delivered from the compartment holding said unexposed cassettes regardless of the orientation of said holder.

2. In an automatic seriograph, a cassette holder for use with an X-ray machine and adaptable to permit operation in either a vertical or horizontal position, said cassette holder comprising: a housing; a slidable drawer in said housing containing compartments for holding stacks of unexposed and exposed cassettes, the compartment for containing exposed cassettes including means for stacking said exposed cassettes in a position removed from the path along which newly exposed cassettes are delivered thereto regardless of the orientation of said cassette holder; horizontally aligned trunnions carried by the underside of said housing, said trunnions defining an axis passing substantially through the center of gravity of the housing; and supporting bracket means for engaging said trunnions for supporting the housing for pivotal movement about said axis.

3. In an automatic seriograph operable for taking successive X-ray pictures from either a vertical or horizontal position, a non-jammable cassette holder for receiving exposed cassettes, said cassette holder being positionable in a horizontal or vertical plane and comprising a bottom wall and a back wall normally extending generally horizontally and vertically respectively when said holder is in its horizontal plane, said back wall being provided with a downwardly and backwardly sloping portion and having a stop shoulder on the lower end thereof, said sloping portion, when said holder is in a vertical plane, providing an incline down which exposed cassettes may slide and stack against said shoulder, while the opposite edges of the cassettes stack against said bottom wall of the holder.

4. In an automatic seriograph operable in conjunction with an X-ray machine for taking X-ray pictures in either a horizontal or vertical position, a non-jammable casette holder for holding exposed cassettes, said holder comprising walls forming an open-topped compartment, one wall of which is inclined to the vertical when the cassette holder is in either a vertical or horizontal position, said wall terminating in a stop shoulder, whereby one edge of the cassettes when delivered into the holder slide along said inclined wall and stack against the stop shoulder, while the opposite edges of the cassettes stack against the bottom wall of the holder.

References Cited in the file of this patent

UNITED STATES PATENTS

| | | |
|---|---|---|
| 1,059,488 | Rosenthal | Apr. 22, 1913 |
| 2,107,825 | Humphreys | Feb. 8, 1938 |
| 2,554,051 | Newton | May 22, 1951 |
| 2,617,944 | Sanchez-Perez | Nov. 11, 1952 |
| 2,881,323 | Clark | Apr. 7, 1959 |

FOREIGN PATENTS

| | | |
|---|---|---|
| 617,604 | France | Nov. 22, 1926 |